United States Patent [19]

Naudet

[11] Patent Number: 5,328,327
[45] Date of Patent: Jul. 12, 1994

[54] STATOR FOR DIRECTING THE INLET OF AIR INSIDE A TURBO-ENGINE AND METHOD FOR MOUNTING A VANE OF SAID STATOR

[75] Inventor: Jacky Naudet, Bondoufle, France

[73] Assignee: Societe Nationale d'Etude et de Construction de Moteurs d'Aviation "S.N.E.C.M.A.", Paris, France

[21] Appl. No.: 983,231

[22] Filed: Nov. 30, 1992

[30] Foreign Application Priority Data

Dec. 11, 1991 [FR] France ................................ 91 15334

[51] Int. Cl.⁵ .................................................. F01D 9/02
[52] U.S. Cl. .................................... 415/160; 415/189; 415/209.4; 29/889.22
[58] Field of Search ................ 415/148, 151, 159, 160, 415/189, 191, 209.3, 209.4; 29/889.22, 889.1, 889.2

[56] References Cited

U.S. PATENT DOCUMENTS

| | | | |
|---|---|---|---|
| 3,567,331 | 3/1971 | Corrigan et al. ...................... | 415/160 |
| 3,736,070 | 5/1973 | Moskowitz et al. .................. | 415/160 |
| 4,498,790 | 2/1985 | Fisher . | |
| 4,604,030 | 8/1986 | Naudet ................................. | 415/160 |
| 5,129,783 | 7/1992 | Hayton .............................. | 415/209.3 |

FOREIGN PATENT DOCUMENTS

| | | | |
|---|---|---|---|
| 0259221 | 3/1988 | European Pat. Off. . | |
| 566026 | 8/1977 | U.S.S.R. ............................... | 415/151 |
| 362286 | 12/1931 | United Kingdom ................ | 415/189 |
| 609682 | 10/1948 | United Kingdom ................ | 415/160 |

Primary Examiner—Edward K. Look
Assistant Examiner—James A. Larson
Attorney, Agent, or Firm—Oblon, Spivak, McClelland, Maier & Neustadt

[57] ABSTRACT

A stator for a turbo-engine and a method for mounting the stator serve to improve fixing of the vanes of the stator and resistance of these vanes to impact in the event foreign bodies enter the turbo-engine. The stator includes several vanes radially maintained by their external and internal pivots between an internal ferrule and an external casing. The internal ferrule includes at least one bore intended to receive one of the internal pivots and the external casing includes a mechanism for the radial positioning and locking of the vane so as to make it possible to keep the internal pivot of the vane in the bore.

12 Claims, 6 Drawing Sheets

STATOR FOR DIRECTING THE INLET OF AIR INSIDE A TURBO-ENGINE AND METHOD FOR MOUNTING A VANE OF SAID STATOR

FIELD OF THE INVENTION

The present invention concerns a stator for directing the inlet of air inside a turbo-engine or a compressor, such as that of an airplane turbojet engine. The invention also concerns the method for mounting a vane of said stator.

BACKGROUND OF THE INVENTION

The general structure of a turbojet engine shall now be mentioned in brief with reference to FIG. 1. The turbojet engine is traversed by a current of axial air (symbolized by the arrow F). It successively includes a blower or low-pressure compressor 1, a high-pressure compressor 3, a combustion chamber 5, a turbine 7 and an air ejection pipe 9. The air sucked up by the turbojet engine successively traverses the low-pressure compressor 1 and the high-pressure compressor 3 where it is compressed, and then the combustion chamber where it is heated, and finally the pipes 9 where it is ejected.

The constant search for weight reduction has led motorization technicians to study and produce compressors fitted with hollow vanes or vanes made of a composite material. The use of these techniques unfortunately results in the production of vanes which are more fragile than those vanes used hitherto.

Furthermore, increasing of the diameter of blowers is a determinant factor concerning the risks of foreign bodies being sucked up from the ground or during flight. For example, these foreign bodies may be birds which may be present in large numbers when airplanes fly at high speeds or at low altitudes. At high altitudes, these foreign bodies may be pieces of ice.

When these foreign bodies penetrate into the blower or low-pressure compressor 1, they generally result in a slight movement in the axial direction of the vanes of the stator or the vanes of the rotor, and indeed may even result in breaking of these vanes as they are quite fragile. When a vane of a stage moves, they abut against the vanes of the next stage and thus break. The vane fragments then penetrate into the high-pressure compressor 3 resulting in secondary damage to the vanes of the stator and the rotor.

It is thus important to ensure that the vanes do not move axially towards the front or rear of the turbojet engine as a result of an impact with a foreign body.

One first solution to try to resolve the damage caused to vanes by foreign bodies entering is described in the patent application FR-2 326 603. The vane described in this document is intended to be placed in an air flow blowing channel and be disposed in series with an adjacent vane against which it is likely to abut in the event of an impact occurring. These vanes are conventionally orientated radially inside the blowing channel. Each vane is constituted in this case by one metallic main portion fitted at its extremities with pivots allowing for a selective rotation of the vane around the axis defined between the two pivots. This vane has in its external downstream radial portion a block made of a composite material. This block is generally made of a graphite-epoxy composite material and forms the trailing edge of the vane. It is fixed rigidly to the rest of the vane by means of an adhesive, for example. This block is able to break and separate from the metallic portion, either when it directly receives an impact, or when the vane moves and when the block abuts against the following vane. Thus, at the time of impact, only the more fragile block made of a composite material is split into small pieces and, when these pieces are sucked up by the compressor, they do not cause any secondary damage downstream.

This technique, even if it does partially limit damage caused to the vanes of the secondary stages of the compressor, does not prevent the axial movement of this vane.

The vanes of the prior art are generally fixed as shown on FIG. 2.

The vane 11 is fixed at its two extremities between an external casing of the cylindrical stator (not shown in FIG. 2) and an internal ring-shaped ferrule 13 disposed coaxially inside the external casing. Each vane 11 has at its internal radial extremity a platform 14 ending in a pivot 15. This pivot 15 is maintained between two annular half-rings 17 and 19 fixed around the ferrule 13 of the compressor. An antifriction washer 20 is placed between the pivot 15 and the two half-rings 17 and 19. In addition, these two half-rings 17 and 19 are kept assembled by a set of soldered plates 21 which comprise a gasket 22. As can be seen in FIG. 2, the vane 11 is not locked at its base (towards the center of the engine), and the platform 14 merely rests inside a housing 23 provided in the half-rings 17 and 19. This explains the easy axial movement of the vane when a foreign body enters.

SUMMARY OF THE INVENTION

Accordingly, the aim of the invention is to overcome these drawbacks and concerns a stator directing the inlet of air into a turbo-engine. In the invention, it is preferable that this stator is situated at the entrance of the high-pressure compressor 3 and is indicated by reference number 30, as shown on FIG. 1. However, it is quite clear that a stator constituted in this way could be placed in front of the blower 1 and even more generally in all other types of gas turbines or turbines with hydraulic transmission.

The invention concerns a stator directing the inlet of air inside a turbo-engine, said stator including a set of vanes kept radially inside an air intake channel between an internal ferrule and a radially external casing, each vane being provided with one internal pivot and one external pivot respectively integral with its internal and external extremities, these two pivots defining the radial axis of the vane, the external casing being provided with at least one bore intended to receive the external pivot.

According to the characteristics of the invention, the internal ferrule includes at least one bore intended to receive and to allow for embedding of, one of said internal pivots, the external casing includes means for the radial positioning and locking of at least one vane, said means for the radial positioning and locking of at least one vane making it possible to keep the radial extremity of the internal pivot of said vane in one of the bores provided in the internal ferrule when the vane is mounted in the stator and the external casing as a housing for receiving the external extremity of the vane, and the bore receiving the external pivot opens inside this housing. Further, the distance between the external extremity of the vane and the radial extremity of the internal pivot is less than the distance between the bottom of this housing and the face of the internal ferrule directed towards the inside of the air intake channel.

These vane radial positioning and locking means combined with the bore of the internal ferrule make it possible to firstly ensure the double embedding of the vane at its two extremities, and secondly facilitate the mounting of the vanes.

Advantageously, the vane locking and radial positioning means include a bush threaded on its external surface and disposed around the external pivot, the bore of the external casing being threaded so as to be able to cooperate with said bush. An antifriction ring is provided between said bush and the external pivot. The radially internal extremity of the bush rests on the external extremity of the vane so as to prevent any radial movement of the vane once the latter is fixed in the stator.

These vane locking and radial positioning means are thus easy to produce and install and do not involve any significant excess costs.

Moreover, the locking and positioning means include a washer disposed around the external pivot of the vane between the bottom of said housing and the external extremity of the vane; the radially internal extremity of the bush resting against at least one portion of this washer.

Finally, according to other characteristics of the invention, the internal pivot of the vane is kept between two half-rings disposed around the internal ferrule, each half-ring having at least one housing for receiving one portion of the internal extremity of the vane, these two half-rings being kept opposite each other by at least one support pierced with an orifice opposite the bore of the internal ferrule and allowing for passage of the internal pivot.

As the conventional mode for fixing the radially internal portion of the vane has been modified so as to enable it to be embedded, it has therefore been found necessary to embody an orifice in the support so as to allow for passage of the internal pivot through said orifice until it arrives inside the bore of the internal ferrule.

Finally, if it is desired to vary the angle of incidence of the vane with respect to the current of fluid traversing the turbo-engine, the free extremity of the external pivot is connected to means for making the vane pivot around its radial axis.

The invention also concerns a method for mounting a vane of said stator, this mounting seeking to ensure the double embedding of the vane inside the stator. This mounting method includes the following stages:

introducing the external pivot of the vane into the bore of the external casing from the inside of the air intake channel so as to embody the first embedding of the vane, having this vane pivot around its radial axis so as to be able to completely drive in the external pivot in said bore, introducing from outside the external casing the vane radial positioning and locking means, installing the internal ferrule via axial movement inside the turbo-engine, having the vane pivot until its leading edge is brought to the entrance of the air intake channel, radially moving the vane until the extremity of the internal pivot is brought into the bore of the internal ferrule so as to embody the second embedding of the vane, moving the locking and radial positioning means until the latter lock the vane and prevent the internal pivot from leaving the bore of the internal ferrule.

More specifically, this method consists of:

disposing a washer around the external pivot of the vane, introducing said external pivot into the bore of the external casing from inside the air intake channel so as to effect the first embedding of the vane, having the vane pivot around its radial axis so as to be able to completely drive in the vane and have the washer come into contact with the bottom of the housing of the external casing, introducing an antifriction ring inside the bush, screwing the bush in the bore of the external casing from the outside of the air intake channel until its radially internal extremity comes into contact with the washer, installing the two half-rings on both sides of the internal pivot, installing the support of these two half-rings, introducing the internal ferrule axially, having the vane pivot until the leading edge is brought back to the direction of the entrance of the air intake channel, moving the vane and the washer radially inwardly until the extremity of the internal pivot traverses the support and penetrates into the bore of the internal ferrule, thus embodying the second embedding of the vane, screwing the bush until its radially internal extremity touches the washer and locks the vane radially.

BRIEF DESCRIPTION OF THE DRAWINGS

The invention shall be more readily understood from a reading of the following description of one preferred embodiment given by way of non-restrictive explanatory example with reference to the accompanying drawings in which.

DESCRIPTION OF THE PREFERRED EMBODIMENTS

Figure 3:
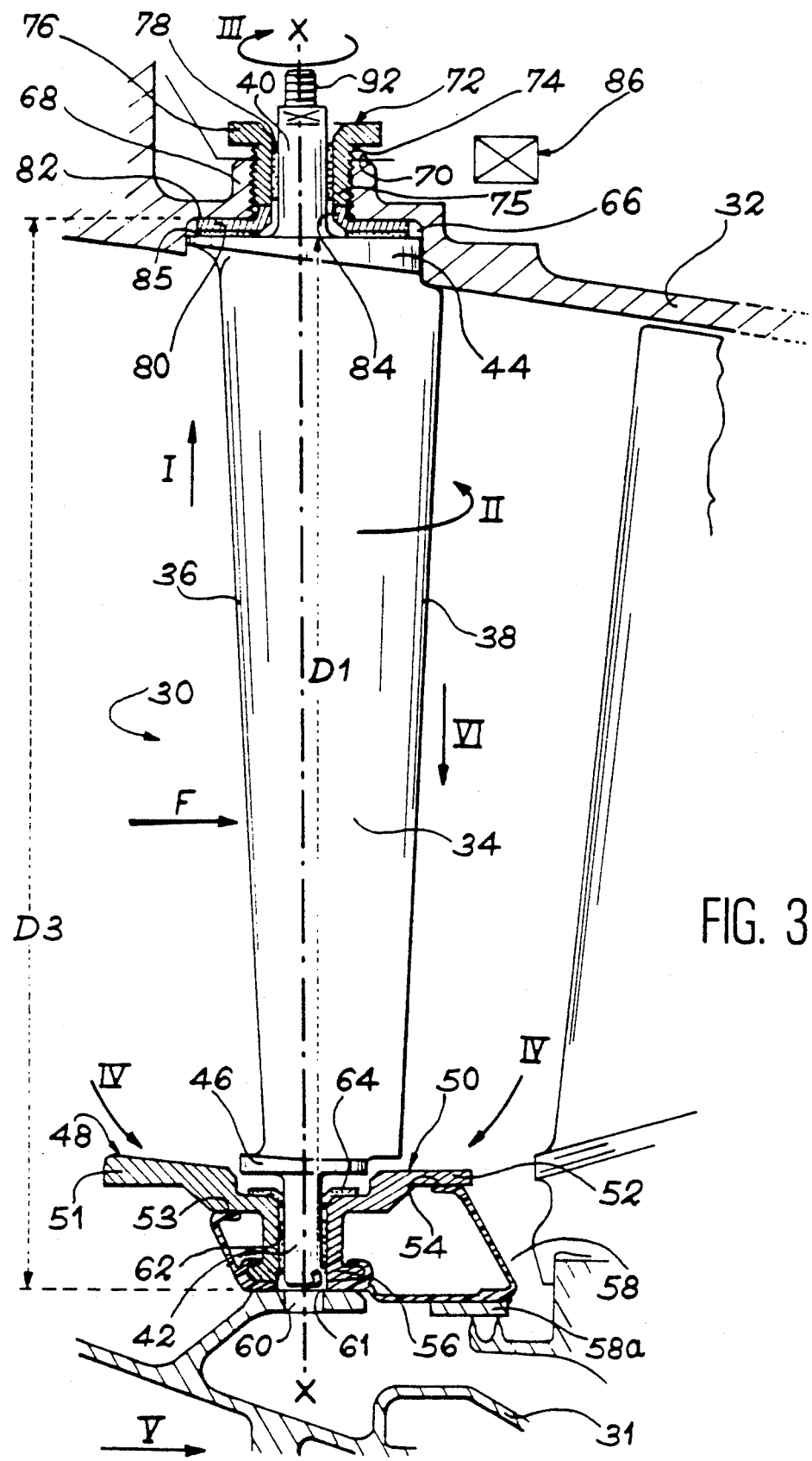
FIG. 3 is a partially cutaway view of a vane of the stator of the invention during the first part of the mounting method.

As shown in FIG. 3, the air penetrates inside the stator along an axial direction shown by the arrow F so as to be brought inside a turbo-engine, for example inside the high-pressure compressor of a turbojet engine. An air intake channel is defined by two walls constituted, at least partially, by one internal ferrule 31 and by one radially external casing 32. The external casing 32 is ring-shaped and surrounds the ferrule 31. The vanes 34 of the stator (only one being shown on FIG. 3) direct the flow of air inside the intake channel. These vanes are disposed radially with respect to the axial direction F. In the remainder of the description, the word 'internal' shall relate to the elements of portions of elements radially directed towards the inside of the stator and conversely for the word 'external'. Each vane 34 has one leading edge 36 directed towards the air inlet and one opposing trailing edge 38. Each vane 34 is provided at its external extremity with one external pivot 40 and at its internal extremity with one internal pivot 42. These two pivots define the radial axis X—X of the vane. In the particular case of the vane shown on FIG. 3—and this is frequently the case—, the vane 34 further includes one external platform 44 and one internal platform 46. In the remainder of the description, these platforms 44 or 46 shall sometimes be designated by the more general term 'extremity'. In fact, it is important to note that all the vanes do not have a platform.

Figure 1:
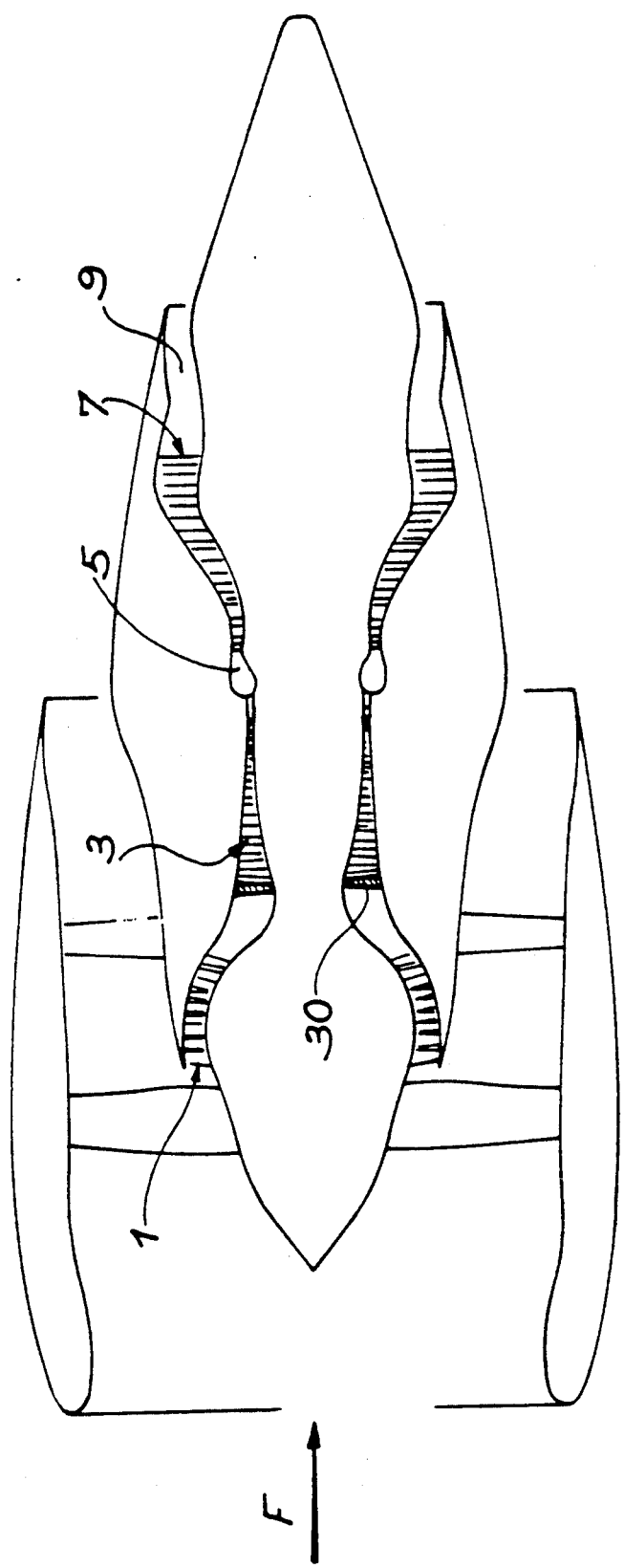
FIG. 1 is a diagram showing a full view of the turbo-engine.
Figure 2:
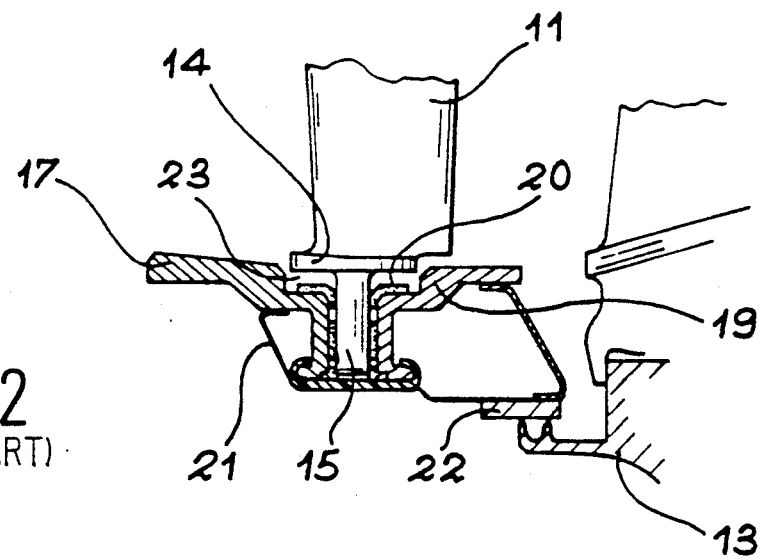
FIG. 2 is a view showing a mode for the conventional fixing of the vanes of a stator according to the prior art.
Figure 4:
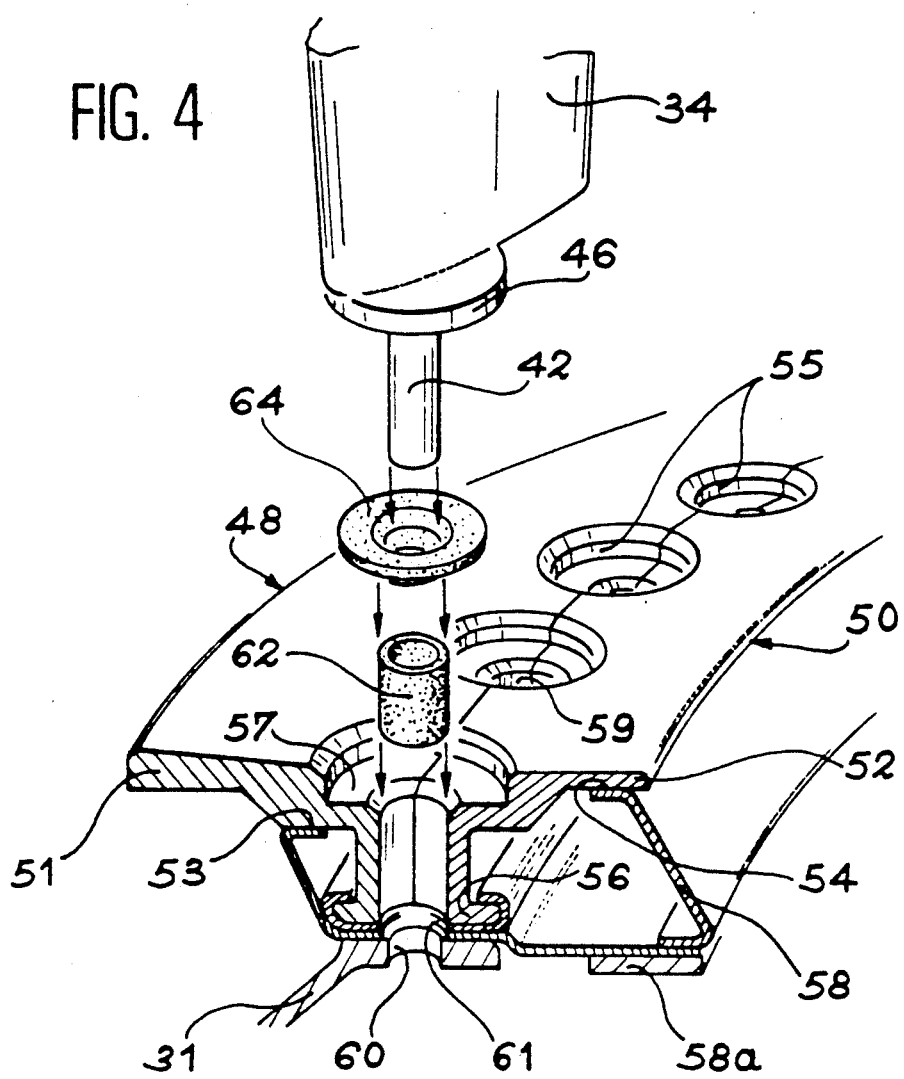
FIG. 4 is an exploded perspective view of the internal portion of the vane and the internal ferrule.

As conventionally shown in FIGS. 3 and 4, the internal pivot 42 of the vane is maintained between two half-rings 48 and 50, the latter being annular and completely surrounding the internal ferrule 31. These two half-rings 48 and 50 are in fact constituted by complementary symmetrical profiles. Each profile 48, 50 has one shoulder 51 (respectively 52) defining two internal support zones 53 and 54. In its radially internal portion, each half-ring 48, 50 further has one shoulder forming a projection 56. Moreover, each half-ring 48, 50 has in its central portion a set of half-countersinkings or housings 55 and when the two half-rings 48, 50 are assembled, these half-countersinkings 55 define an annular shoulder 57 (see FIG. 4). These two half-rings are kept in place by a support unit 58 constituted by soldered plates. This unit simultaneously supports the two shoulders 57, takes support on the contact zones 53 and 54 and on the internal ferrule 31 and bears a gasket 58a. Each half-ring 48, 50 further has several vertical radial throats which, once the two half-rings 48 and 50 have been assembled, form orifices 59 intended to receive the pivots 42. The shape and fixing of the two half-rings 48 and 50 and the support 58 are extremely conventional and shall not be described further in detail.

Figure 5:
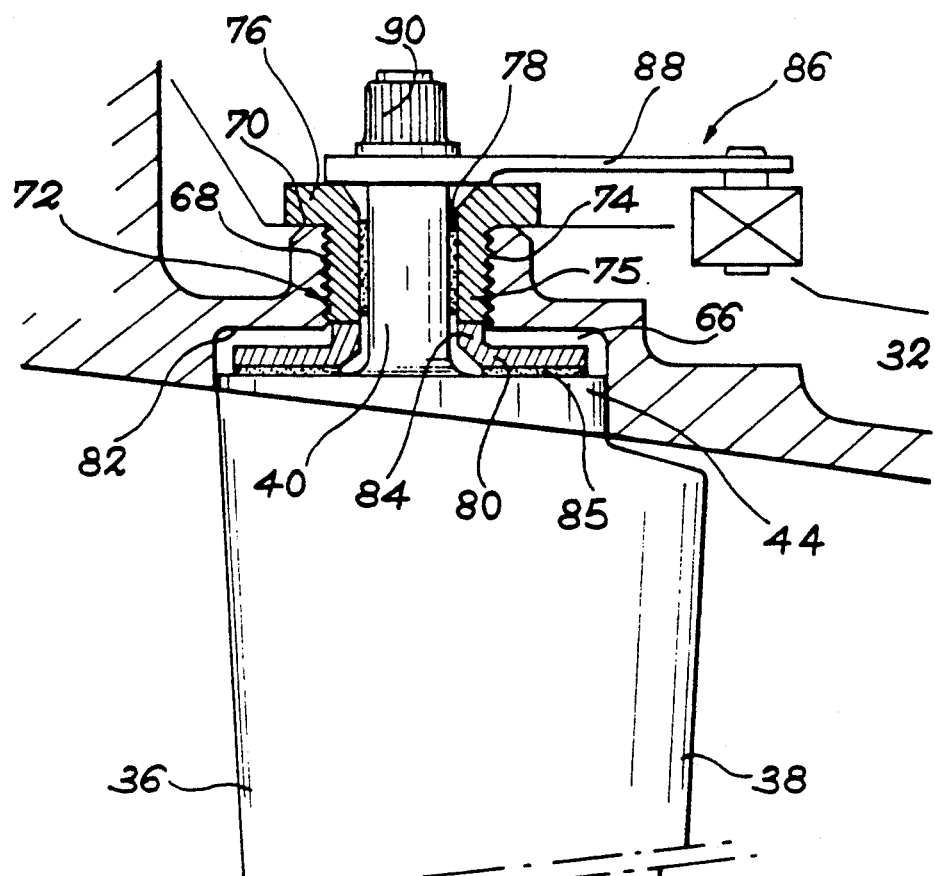
FIG. 5 is a truncated partially cutaway view of the vane after it has been mounted inside the internal ferrule and the external casing.
Figure 5:
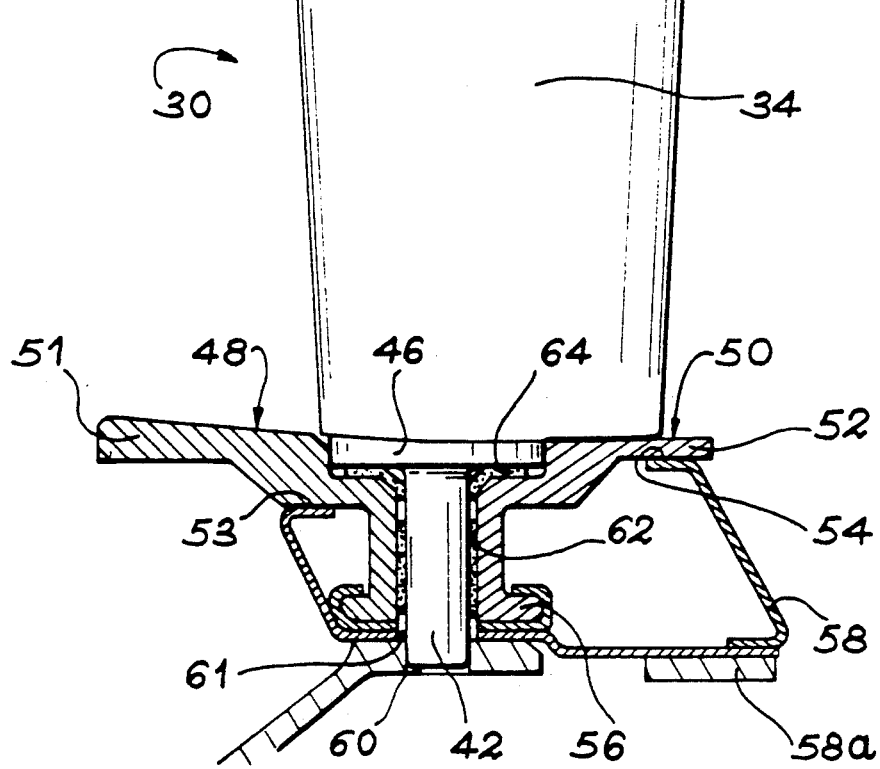

According to the characteristics of the invention and as shown on FIGS. 3 and 5, the internal ferrule 31 has a bore 60 allowing, contrary to what existed in the prior art, the internal pivot 42 of the vane to be embedded. The support 58 also has an orifice 61. When the vane is mounted, as shown on FIG. 5, the internal pivot 42 penetrates inside this bore 60. In addition, an antifriction ring 62 and an antifriction washer 64 are disposed respectively between the two half-rings 48 and 50 and the internal pivot 42 and between these half-rings and the internal platform 46 of the vane 34. The antifriction ring 62/antifriction washer 64 unit may also be a monoblock.

Furthermore and as shown on FIGS. 3 and 5, the external casing 32 is provided with a housing 66 receiving the platform 44 of the vane, this housing 66 extending outwardly by a tapped bore 68 intended to receive the external pivot 40. This tapped bore 68 has an external shoulder 70. A bush 72 threaded on its external surface (reference 74) is disposed around the pivot 40 and partially inside the bore 68. In its radially internal portion, this bush has one extremity 75 and in its radially external portion a shoulder 76 extending radially (with respect to the longitudinal axis of the bush). An antifriction ring 78 is disposed between this bush and the external pivot 40. This bush and a washer 80 constitute the means for the radial positioning and locking of the vane. This washer 80 is disposed between the bottom 82 of the housing 66 and the external surface of the platform 44.

According to the invention, this washer 80 preferably has in its central portion a shoulder 84 forming an annular projection. An antifriction ring 85 is preferably provided between the washer 80 and the platform 44. The radially internal extremity 75 of the bush 72 rests on the washer 80 or more specifically on its shoulder 84. However, in another embodiment variant, the washer 80 and the ring 85 could be suppressed and would be necessary when the extremity 75 of the bush rests directly on the external extremity 44 of the vane so that said vane is locked. Finally, as shown on FIG. 5, the vanes are able to pivot around their radial axis X—X by means denoted under the general reference 86. As shown on FIG. 5, these means conventionally include a rocker bar 88 kept at the extremity of the external pivot 40 with the aid of a bolt cooperating with the threaded extremity (see FIG. 3) of the external pivot 40.

The successive stages of mounting are now to be described in detail with reference to FIG. 3.

First of all, the antifriction ring 85 and the washer 80 are disposed around the external pivot 40. Then the unit is introduced into the external casing 32 through the interior of the air intake channel until the external pivot 40 penetrates into the bore 68 (i.e. the operation shown by the arrow I). This makes it possible to carry out the first embedding of the vane. Then the vane 34 is made to slightly pivot around its radial axis X—X so as to move it from the position shown in FIG. 5 to the position shown in FIG. 3 where the upper portion of its trailing edge 38 no longer abuts the external casing 32 (i.e. the operation shown by the arrow II). This makes it possible to drive in the vane 34 until the washer 80 abuts against the bottom 82 of the housing 66. Then the antifriction ring 78 is disposed inside the bush 72 and introduced around the pivot 40 from outside of the casing 32. This bush 72 is screwed inside the tapped bore 68 until its radially internal extremity 75 comes into contact with the projection 84 of the washer 80 (i.e. the operation shown by the arrow III).

When this vane 34 and possibly the other vanes of the stator have been disposed in this way and after the antifriction ring 62 and the antifriction washer 64 have been carefully disposed, the two half-rings 48 and 50 are placed on both sides of the internal pivot 42. Then the support 58 (i.e. the operation shown by the arrows IV) is placed.

Next, the internal ferrule 31 is introduced in an axial direction until the bore 60 is opposite the internal pivot 42 and the orifice 61 (i.e. the operation shown by the arrow V). As shown on FIG. 3, this operation is possible to the extent that the distance D1 between the radially external extremity 44 of the vane and the free extremity of the internal pivot 42 is less than the distance D3 between the internal ferrule 31 and the bottom 82 of the housing 66.

Then the vane 34 is radially moved (i.e. the operation shown by arrow VI) inwardly so as to bring the pivot 42 into the bore 60 and so that the platform 46 rests on the antifriction washer 64 at the bottom of the housing. Next, the second embedding of the vane is effected. This operation is completed by making the vane move inversely to that of the arrow II until its leading edge 36 is brought back into the direction of opening of the air intake channel, as shown on FIG. 5.

Finally, the bush is fully screwed until the radially internal extremity 75 of the bush again touches the washer 80 (more specifically the projection 84). This makes it possible to stop any subsequent radial movement of the vane 34. It is important that the shoulder 76 of the bush 72 does not abut against the external shoulder 70 of the bore 68 before the extremity 75 of the bush touches the projection 84. The dimensions of these various elements shall thus be calculated according to these requirements.

Figure 6:
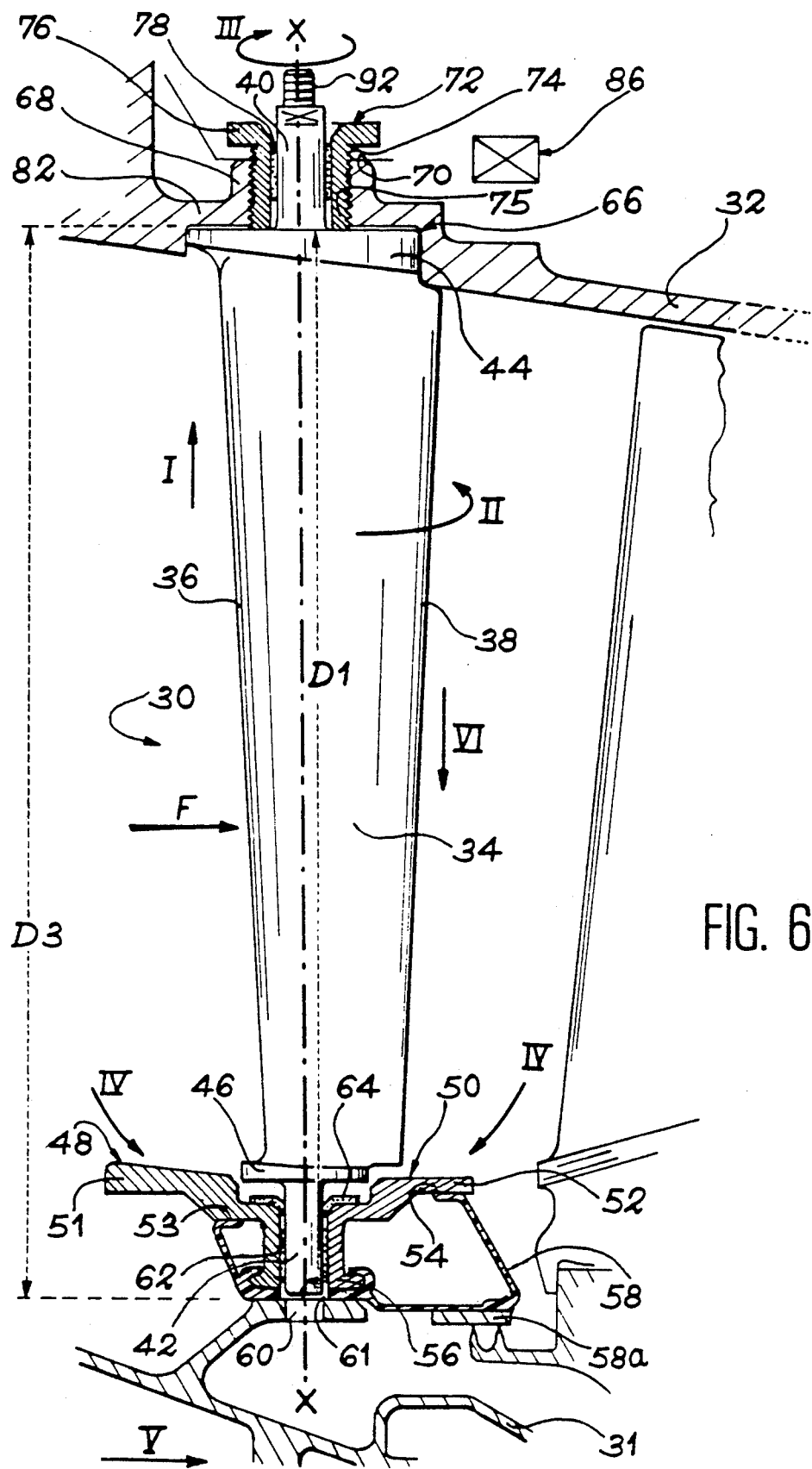
FIGS. 6 and 7 correspond to FIGS. 3 and 5, respectively, but wherein the antifriction ring has been deleted.
Figure 7:
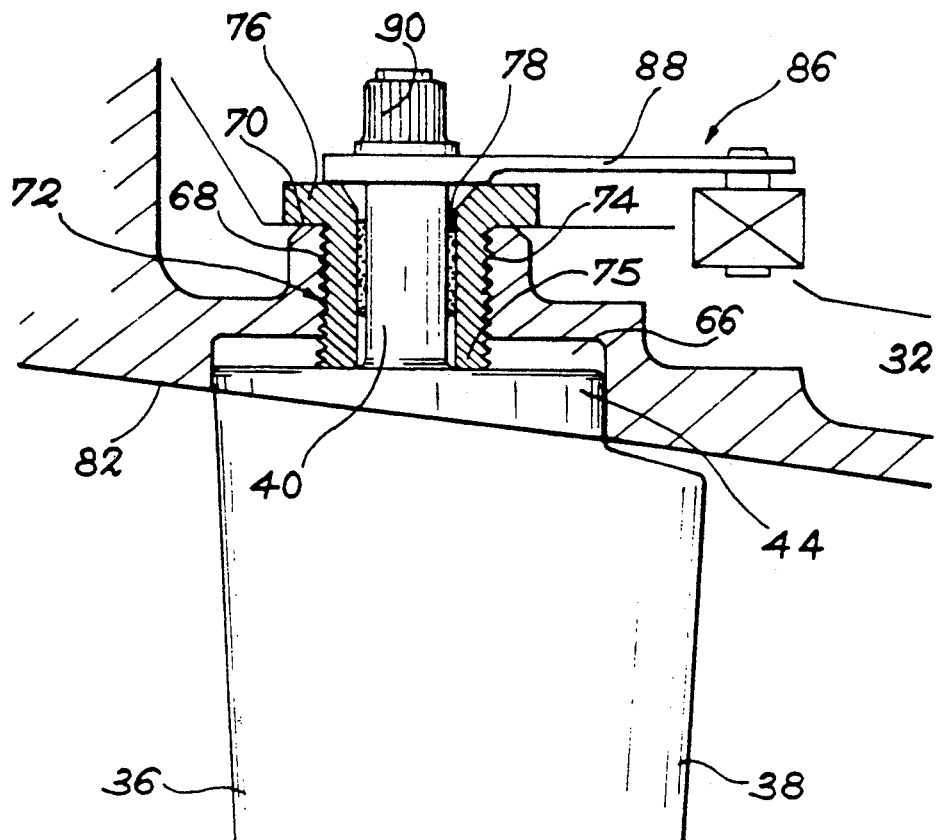
Figure 7:
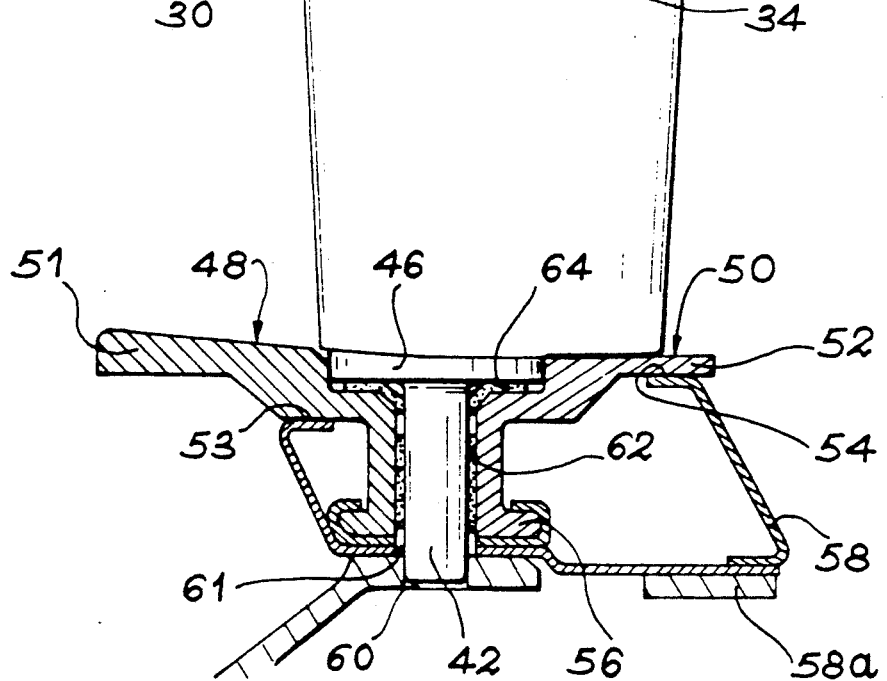

For the second embodiment of the invention (i.e. without the washer 80 and the antifriction ring 85) reference should be made to FIGS. 6 and 7. Here, each vane is introduced into the external casing 32 through the inside of the air intake channel until the external pivot 40 penetrates into the bore 68 (i.e. see arrow I.) The vane 34 is made to slightly pivot around its radial axis X—X so as to move it from the position of FIG. 5 to the position of FIG. 3. This makes it possible to drive in the vane 34 until the radially external extremity 44 of the vane abuts the bottom 82 of the housing 66 (see FIG. 6). The bush 72 (provided with the antifriction ring 78) is screwed inside the tapped bore 68 until its radially internal extremity 75 comes into contact with the radially external extremity 44 of the vane (i.e. see arrow III in FIG. 6). When all of the vanes 34 have been disposed in this manner, the two half-rings 48 and 50 are placed on both sides of all of the internal pivots 42, the support 58 is placed and the internal ferrule 31 is introduced in an axial direction (i.e. see arrows IV and V in FIG. 6). Then the vane 34 is radially moved (i.e. see arrow VI in FIG. 6) so as to bring the pivots 42 into the bore 60. The vane is movable universally as indicated by arrow II. Finally, the bush 72 is fully screwed until the radially internal extremity 75 of the bush again touches the radially external extremity 44 of the vane (see FIG. 7).

This method of mounting the vane is also possible because the distance D1 between the radially external extremity 44 of the vane and the radial extremity of the internal pivot 42 is less (i.e. only slightly less in this case) than the distance D3 between the bottom 82 of the housing 66 and the face of the internal ferrule (around the bore 60), directed towards the inside of the air intake panel. In this embodiment as well as the first embodiment, the length of the pivot 42 must be great enough to allow the extremity of the pivot to penetrate inside the bore 60 when the platform 46 abuts against the antifriction washer 64. In the same manner, the length of the bush 72 must be great enough to allow its extremities 75 to abut against the vane 44 or the washer 80, when the vane 44 is in an up-position (FIG. 3 or 6) and to define a small gap between the shoulder 76 of the bush 72 and the external shoulder 70 of the tapped bore 68.

What is claimed is:

1. A stator for directing the inlet of air inside a turboengine, said stator comprising:
    a set of vanes located radially inside an air intake channel between an internal ferrule and a radially external casing, each vane being provided with an internal pivot and an external pivot respectively integral with internal and external extremities thereof, said internal and external pivots defining the radial axis of the vane,
    the external casing being provided with at least one bore for receiving the external pivot of each said vane, wherein the internal ferrule includes at least one bore for receiving and having embedding therein one of said internal pivots,
    the external casing including a mechanism for radial positioning and locking of at least one of said vanes so as to keep the radial extremity of the internal pivot of said vane in one of said at least one bore provided in the internal ferrule when the vane is mounted in the stator wherein the external casing has a housing for receiving the external extremity of the vane, the bore receiving the external pivot opens inside said housing and wherein the distance between the external extremity of the vane and the radial extremity of the internal pivot is less than the distance between the bottom of said housing and the face of the internal ferrule directed towards the inside of the air intake channel.

2. Stator according to claim 1, wherein the vane radial positioning and locking mechanism includes a bush threaded on an external surface thereof and disposed around the external pivot, the bore of the external casing being tapped so as to cooperate with said bush, wherein an antifriction ring is provided between said bush and the external pivot and wherein the radially internal extremity of the bush rests on the external extremity of the vane so as to prevent the vane from moving radially once the vane has been fixed in the stator.

3. Stator according to claim 1, wherein the vane positioning and locking mechanism comprises a bush and a washer, the bush being threaded on an external surface thereof and disposed around the external pivot, the bore of the external casing being tapped so as to cooperate with said bush, and the washer being disposed around the external pivot of the vane between the bottom the housing of the external casing and the external extremity of the vane and wherein the radially internal extremity of the bush rests against at least one portion of this washer.

4. Stator according to claim 1, wherein the vane positioning and locking mechanism comprises a bush and a washer, the bush is threaded on an external surface thereof and disposed around the external pivot, the bore of the external casing is tapped so as to cooperate with said bush, and the washer is disposed around the external pivot of the vane between the bottom of the housing of the external casing and the external extremity of the vane and wherein the radially internal extremity of the bush rests against at least one portion of said washer and an antifriction ring is provided between the bush and the external pivot.

5. Stator according to claim 3 or 4, wherein the washer has in a central portion thereof an annular projection for cooperating with the radially internal extremity of the bush.

6. Stator according to claim 1, wherein the internal pivot of the vane is positioned between two half-rings disposed around the internal ferrule, each half-ring having at least one housing for receiving one portion of the internal extremity of the vane, and said half-rings are kept opposite each other by at least one support having an orifice located opposite the bore of the internal ferrule for allowing passage of the internal pivot.

7. Stator according to claim 3 or 4, which comprises an antifriction ring provided between the external extremity of the vane and the washer.

8. Stator according to claim 1, wherein the extremity of the external pivot is connected to a mechanism for enabling the vane to pivot around the radial axis thereof.

9. A method for mounting vanes of a stator, the vanes being kept radially inside an air intake channel between one internal ferrule and one radially external casing, each vane being provided with an internal pivot and an external pivot respectively internal with internal and external extremities thereof, said external and internal pivots defining the radial axis of each said vane, wherein the method comprises:
- introducing the external pivot of the vane into a bore of the external casing from inside the air intake channel so as to complete a first embedding of the vane,
- pivoting said vane around the radial axis thereof so as to fully drive the external pivot of the vane into the bore of the external casing, and so that the external extremity of the vane abuts against a bottom portion of a housing provided in the external casing to receive the external extremity of the vane,
- introducing a vane radial positioning and locking mechanism from outside of the external casing,
- installing the internal ferrule via axial movement inside the stator,
- pivoting the vane until the leading edge of the vane is brought towards the entrance of the air intake channel,
- radially moving the vane until the extremity of the internal pivot is brought into a bore of the internal ferrule so as to complete a second embedding of the vane, and
- moving the radial positioning and locking mechanism until locking of the vane occurs so as to prevent the internal pivot from becoming dislodged from the bore of the internal ferrule.

10. Method according to claim 9 for mounting a vane of a stator, which comprises:
- disposing a washer around the external pivot of the vane,
- introducing said external pivot provided with the washer into the bore of the external casing from the inside of the air intake channel so as to carry out the first embedding of the vane,
- pivoting the vane pivot around the radial axis thereof so as to fully drive the external pivot into the bore of the external casing and so that the washer comes into contact with the bottom of the housing of the external casing,
- introducing an antifriction ring inside a bush tapped on the external surface thereof,
- screwing the bush into the bore of the external casing from the outside of the air intake channel until the radially internal extremity of the bush comes into contact with the washer,
- installing two half-rings on both sides of the internal pivot,
- installing a support for said two half-rings,
- axially introducing the internal ferrule,
- pivoting the vane until the leading edge of the vane is brought back to the direction of the entrance of the air intake channel,
- moving the vane and the washer radially towards the inside until the extremity of the internal pivot traverses the support and penetrates into the bore of the internal ferrule, thus completing the second embedding of the vane, and
- screwing the bush until the radially internal extremity of the bush contacts the washer and locks the vane radially in place.

11. Mounting method according to claim 10, which comprises positioning an antifriction ring between the external extremity of the vane and the washer prior to introducing the external pivot into the bore of the external casing.

12. A method for mounting vanes of a stator, the vanes being kept radially inside an air intake channel between one internal ferrule and one radially external casing, each said vane being provided with an internal pivot and an external pivot respectively internal with internal and external extremities of the vane, and said internal and external pivots defining the radial axis of the vane, wherein the method comprises:
- introducing the external pivot of the vane into a bore of the external casing from inside the air intake channel so as to complete a first embedding of the vane,
- pivoting said vane around the radial axis thereof so as to fully drive the external pivot of the vane into the bore of the external casing, and so that the external extremity of the vane abuts against a bottom portion of a housing provided in the external casing to receive the external extremity of the vane,
- positioning an antifriction ring inside a bush threaded on an external surface thereof,
- positioning the bush and antifriction ring around the external pivot, from outside the external casing, the bore of the external casing being tapped so as to cooperate with said bush,
- screwing the bush inside the tapped bore of the external casing until the radially internal extremity of the bush comes into contact with the external extremity of the vane,
- installing the internal ferrule via axial movement inside the stator,
- pivoting the vane until the leading edge of the vane is brought towards the entrance of the air intake channel,
- radially moving the vane until the extremity of the internal pivot thereof is brought into a bore of the internal ferrule so as to carry out a second embedding of the vane, and
- fully screwing the tapped bush until the radially internal extremity of the bush comes into contact with the external extremity of the vane.

* * * * *